(12) United States Patent
Kamimura et al.

(10) Patent No.: US 7,672,074 B2
(45) Date of Patent: Mar. 2, 2010

(54) THERMALLY ASSISTED MAGNETIC RECORDING METHOD

(75) Inventors: Takuya Kamimura, Kawasaki (JP); Koji Matsumoto, Kawasaki (JP); Takeshi Morikawa, Kawasaki (JP); Shingo Hamaguchi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 450 days.

(21) Appl. No.: 11/358,869

(22) Filed: Feb. 21, 2006

(65) Prior Publication Data
US 2006/0221483 A1 Oct. 5, 2006

(30) Foreign Application Priority Data
Mar. 30, 2005 (JP) ............................. 2005-099190

(51) Int. Cl.
*G11B 5/02* (2006.01)
(52) U.S. Cl. ...................... 360/59; 369/13.24
(58) Field of Classification Search ....................... None
See application file for complete search history.

(56) References Cited

U.S. PATENT DOCUMENTS

| | | | | | |
|---|---|---|---|---|---|
| 4,466,004 | A | * | 8/1984 | Kobayashi et al. | 346/74.4 |
| 4,855,975 | A | * | 8/1989 | Akasaka et al. | 369/13.41 |
| 4,872,078 | A | * | 10/1989 | Gerber et al. | 369/13.24 |
| 5,357,493 | A | * | 10/1994 | Okazaki et al. | 369/13.24 |
| 5,402,408 | A | * | 3/1995 | Hirokane et al. | 369/116 |
| 5,530,688 | A | * | 6/1996 | Hurst et al. | 369/116 |
| 6,377,413 | B1 | * | 4/2002 | Sacks et al. | 360/48 |
| 2003/0058751 | A1 | * | 3/2003 | Murakami et al. | 369/13.24 |
| 2006/0028765 | A1 | * | 2/2006 | Coffey et al. | 360/128 |
| 2006/0132957 | A1 | * | 6/2006 | Hamaguchi et al. | 360/59 |

FOREIGN PATENT DOCUMENTS

| | | |
|---|---|---|
| JP | 6-243527 | 9/1994 |
| JP | 2003-157502 | 5/2003 |

\* cited by examiner

*Primary Examiner*—Andrew L Sniezek
(74) *Attorney, Agent, or Firm*—Greer, Burns & Crain, Ltd.

(57) ABSTRACT

A thermally assisted magnetic recording method includes the following steps. The recording layer of a magnetic recording medium is irradiated with a laser beam to produce a locally heated region. This heated region is moved by causing the recording layer and the laser beam to move relative to each other. To record desired information, a recording magnetic field is applied to the heated region of the recording layer. The laser beam has a cross section elongated in the direction in which the heated region is moved.

7 Claims, 8 Drawing Sheets

THERMALLY ASSISTED MAGNETIC RECORDING METHOD

BACKGROUND OF THE INVENTION

1. Field of the Invention

The present invention relates to a thermally assisted magnetic recording method, for recording information on a magnetic recording medium assisted by heat.

2. Description of the Related Art

Existing recording mediums for constituting a storage unit such as a hard disk include a magnetic disk (magnetic recording medium). The magnetic disk has a stacked structure including a disk substrate and a recording layer provided with a predetermined magnetic structure. The increase in amount of information to be processed by a computer system is generating a demand for higher recording density from the magnetic disk.

When recording information on the magnetic disk, a recording magnetic head is placed close to the recording surface (including the recording layer) of the magnetic disk, so that the magnetic head applies to the recording layer a recording magnetic field stronger than the coercivity of the recording layer. The magnetic head is relatively moved with respect to the magnetic disk to sequentially invert the direction of the recording magnetic field applied by the magnetic head, so as to form a plurality of record marks (magnetic domains) having sequentially inverted magnetizing directions on the recording layer, along a circumferential direction of the magnetic disk or along the extension of the track. At this stage, the timing for inverting the direction of the recording magnetic field is controlled so as to form the record marks in the respective predetermined lengths. That is how predetermined signals or information is recorded on the recording layer represented by the variation in magnetizing directions.

In the technical field associated with the magnetic disk, it is known that the higher coercivity the recording layer has, the higher thermal stability the magnetic domain formed on the recording layer acquires, thus constituting a minute or extremely narrow and stable magnetic domain. Reducing a minimum attainable size of the magnetic domain stably formed on the recording layer leads to increasing the recording density of the magnetic disk.

Thus, when recording information on the magnetic disk, it is necessary to apply a recording magnetic field stronger than the coercivity of the recording layer, for properly forming a record mark. Accordingly, increasing the intensity of the recording magnetic field to be applied by the magnetic head could be an option, based on the increase in coercivity granted to the recording layer. The intensity of the recording magnetic field that the magnetic head can apply is, however, subject to a certain limitation from the viewpoint of the structure of the magnetic head as well as the power consumption.

As a solution, a thermally assisted magnetic recording method may be employed for recording information on the magnetic disk. When employing the thermally assisted magnetic recording method to record information on the magnetic disk, for example an optical head disposed close to the recording surface of the rotating magnetic disk emits a laser beam, so as to form a generally circular beam spot on the recording surface such that the beam spot moves thereon, thus locally heating the recording layer of the magnetic disk sequentially. The heated region of the recording layer where the temperature has been elevated incurs degradation in coercivity, in comparison with the surrounding regions where the temperature remains unchanged. Under such state, a magnetic head disposed close to the recording surface of the magnetic disk applies to the heated region a recording magnetic field stronger than the coercivity of the heated region of the recording layer, thus magnetizing a portion of the heated region in a predetermined direction. Such magnetization is fixed during a cooling process of the magnetized portion. By the thermally assisted magnetic recording method, a plurality of magnetic domains (record marks), each having a sequentially inverted magnetizing direction and a predetermined length according to the recorded signal, is thus formed along a track extending circumferentially of the disk. When employing the magnetic disk designed in accordance with the thermally assisted magnetic recording method, the recording magnetic field is applied to the region in the recording layer where the coercivity is degraded by heating, when recording information. Therefore, the intensity of the recording magnetic field to be applied by the magnetic head does not have to be largely increased, even when the coercivity of the recording layer under a normal temperature, i.e. for storing or reproducing the information, is set at a high level. Such thermally assisted magnetic disk is disclosed, for example in the following documents.

Patent document 1: JP-A-H06-243527

Patent document 2: JP-A-2003-157502

In the conventional thermally assisted magnetic recording method, the laser beam is emitted to form a generally circular beam spot on the recording surface such that the beam spot moves on the recording surface, thereby locally heating the recording layer of the magnetic disk sequentially. Heating thus the portion of the recording layer where information is to be recorded leads to a significant increase in temperature of the heated portion, as well as of a peripheral portion. Whereas, with the thermally assisted magnetic disk, it is preferable to grant the recording layer with a higher coercivity for increasing the recording density, and the higher coercivity of the recording layer requires more intense heating of the recording layer. With the conventional thermally assisted magnetic recording method, however, if the heating is so intense when recording information that the temperature is increased over a too extensive region on the recording layer, a cross-write effect may be incurred, for example the record mark excessively spreads over to another track adjacent to the track where the record mark is being formed, thus to erase or degrade the record mark on the adjacent track. The cross-write effect discourages the attempt of making the track finer, and is hence obviously undesirable from the viewpoint of increasing the recording density of the magnetic disk. Consequently, the conventional thermally assisted magnetic disk (thermally assisted magnetic recording medium) has a drawback against increasing the recording density.

SUMMARY OF THE INVENTION

The present invention has been conceived in view of the foregoing situation, with an object to provide a thermally assisted magnetic recording method that effectively prevents the heat from spreading transversely of the track in the recording layer.

A first aspect of the present invention provides a thermally assisted magnetic recording method comprising the steps of: irradiating a recording layer of a magnetic recording medium with a laser beam to produce a locally heated region; moving the heated region by causing the recording layer and the laser beam to move relative to each other; and applying a recording magnetic field to the heated region to record information. In this method, the laser beam has a cross section which is elongated in the moving direction of the heated region (i.e. in the extending direction of a track).

By the thermally assisted magnetic recording method thus arranged, the heated region (region enclosed in an isotherm of a significantly higher temperature predetermined from the viewpoint of the effectiveness of the thermally assisted magnetic recording method) formed on the recording layer by the laser beam irradiation is elongated in the moving direction of the heated region.

By a thermally assisted magnetic recording method in general, the maximum attainable temperature of a region on the track of the recording layer, heated and subjected to application of the recording magnetic field for formation of a record mark, primarily depends on the total amount of the heating energy supplied thereto per a predetermined minute time. In light of this, the method of forming the heated region in an elongated shape in the moving direction thereof is quite advantageous for supplying a sufficient amount of heating energy (originating from the laser beam in this method) to the region on the recording layer where the record mark is to be formed. It is also possible to prevent heat from spreading transversely of the track. The thermally assisted magnetic recording method according to the present invention is, therefore, advantageous in inhibiting or restraining the occurrence of the cross-write effect, so as to increase the recording density of the track.

A second aspect of the present invention provides a thermally assisted magnetic recording method comprising the steps of: causing a heating element to face a recording layer of a magnetic recording medium to produce a locally heated region; moving the heated region by causing the recording layer and the heating element to move relatively to each other; and applying a recording magnetic field to the heated region to record information.

By the thermally assisted magnetic recording method thus arranged, the heated region formed on the recording layer by the heating element facing the recording layer is elongated in the moving direction of the heated region, i.e. in the extending direction of the track. As stated above, the maximum attainable temperature of a region on the recording layer, where the record mark is to be formed, primarily depends on the total amount of the heating energy supplied thereto per a predetermined minute time. Thus, the method of forming the heated region in a shape elongated in the moving direction thereof is quite advantageous for supplying a sufficient amount of heating energy (originating from the heating element in this method) to the region on the recording layer where the record mark is to be formed, while preventing the heat from spreading transversely of the track.

A third aspect of the present invention provides a thermally assisted magnetic recording method comprises the steps of: producing a locally heated region in a recording layer of a magnetic recording medium; and applying a recording magnetic field to the heated region while moving the heated region, to record information. The heated region is produced by forming a plurality of heated spots in the recording layer, where the heated spots area aligned in the moving direction of the heated region in an overlapping manner.

In the thermally assisted magnetic recording method thus arranged, the heated region is a composite heated spot including a plurality of aligned heated spots, in a shape elongated in the moving direction of the heated region.

According to the third aspect of the present invention, preferably, the recording layer may be irradiated with a plurality of laser beams, thus to form a plurality of heated spots. Alternatively, a plurality of heating elements may be disposed so as to face the recording layer and to relatively move with respect thereto, to form a plurality of heated spots. Such methods facilitate properly forming the heated region including a plurality of heated spots aligned in a predetermined direction.

In the third aspect of the present invention, a plurality of peak temperatures of the heated spots may be controlled, in accordance with the moving speed of the heated region on the recording layer. For example, it is preferable to reduce a ratio of peak temperatures of the subsequent heated spots with respect to the peak temperature of the first heated spot in the moving direction of the heated region, when the heated region moves slower. In the thermally assisted magnetic recording method executed with the magnetic recording medium being rotated, controlling thus a plurality of peak temperatures may be beneficial in leveling off the heating energy amount supplied per unit time to the track during the recording, irrespective of a distance between the track and the rotation center of the medium.

In the third aspect of the present invention, distance between positions at which the peak temperatures of the plurality of heated spots are attained may be controlled in accordance with the moving speed of the heated region on the recording layer. For example, it is preferable to increase the distance between the positions corresponding to the peak temperature of the plurality of heated spots, when the heated region moves slower. In the thermally assisted magnetic recording method executed with the magnetic recording medium being rotated, controlling thus the distance between positions corresponding to the peak temperature may be beneficial in leveling off the heating energy amount supplied per unit time to the track during the recording, irrespective of a distance between the track and the rotation center of the medium.

BRIEF DESCRIPTION OF THE DRAWINGS

FIG. 8(a) is a schematic plan view showing two beam spots formed on the cover layer by the thermally assisted magnetic recording method according to the third embodiment, while FIG. 8(b) is a graph showing a temperature distribution on the recording layer created by the thermally assisted magnetic recording method according to the third embodiment;

FIG. 13(a) is a schematic plan view showing two beam spots formed on the cover layer by the thermally assisted magnetic recording method according to the fifth embodiment, while FIG. 13(b) is a graph showing a temperature distribution on the recording layer created by the thermally assisted magnetic recording method according to the fifth embodiment.

DETAILED DESCRIPTION OF THE PREFERRED EMBODIMENTS

Figure 1:
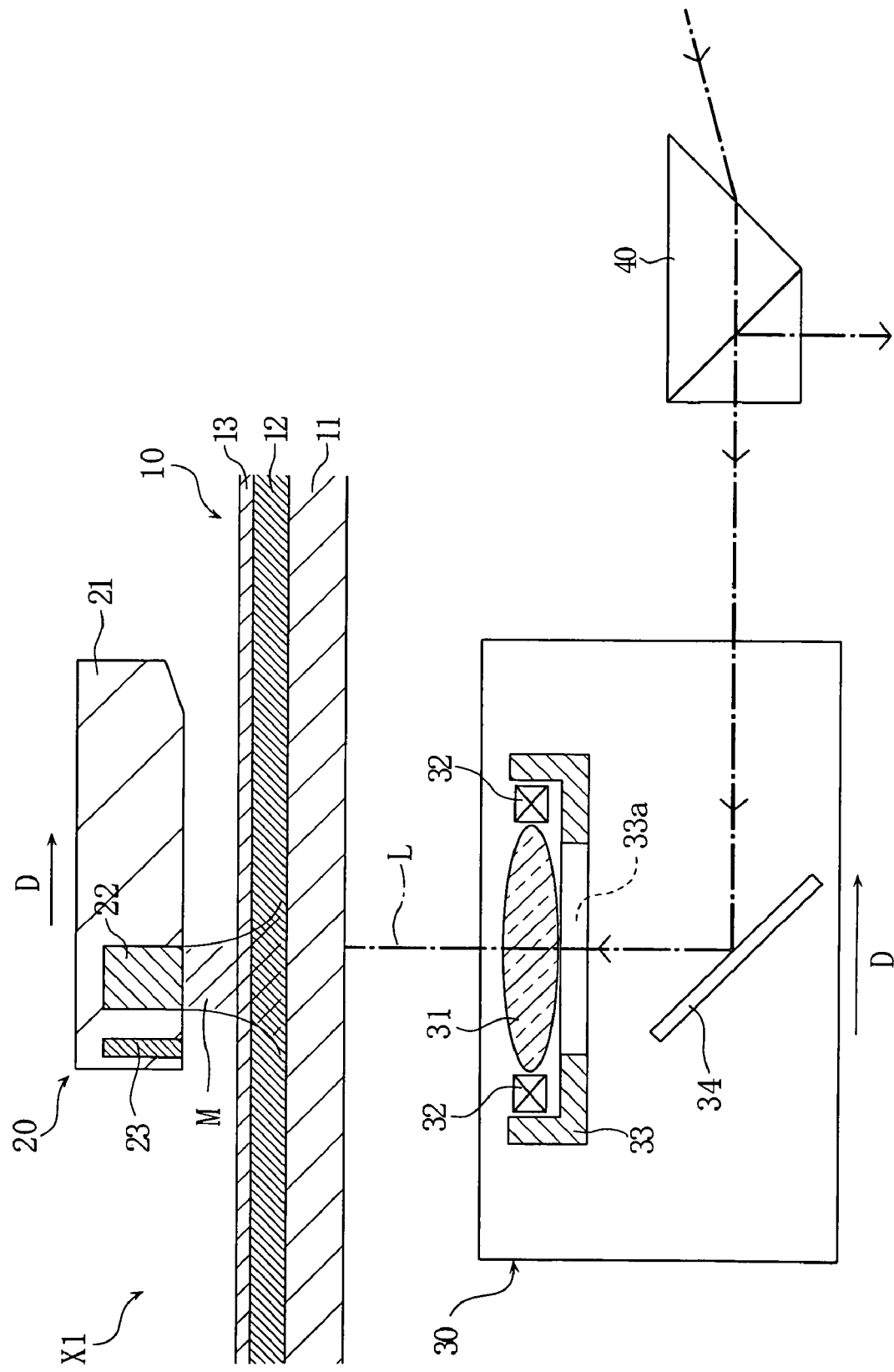
FIG. 1 is a schematic diagram showing a part of a magnetic disk apparatus for executing a thermally assisted magnetic recording method according to a first embodiment of the present invention.

FIG. 1 is a schematic diagram showing a part of a magnetic disk apparatus X1 for executing a thermally assisted magnetic recording method according to a first embodiment of the present invention. The magnetic disk apparatus X1 includes a magnetic disk 10, a magnetic head 20, an optical head 30, and a composite element 40, for recording and reproducing information on and from the magnetic disk 10, by the thermally assisted magnetic recording method.

The magnetic disk 10 has a stacked structure including a disk substrate 11, a recording layer 12, and a cover layer 13, so as to serve as a magnetic recording medium under the thermally assisted magnetic recording system. The disk substrate 11 primarily serves for granting the magnetic disk 10 with sufficient rigidity, and may be constituted of an aluminum alloy, a glass, or a resin. The recording layer 12 is constituted of a vertical magnetized layer or a in-plane magnetized layer, and serves as a recording surface on which information is recorded, in the magnetic disk 10. The recording layer 12 may be constituted of a Co alloy, a Fe alloy, or a rare earth transition metal amorphous alloy. Examples of the Co alloy include a CoCr alloy. Examples of the Fe alloy include a FePt alloy. As the rare earth transition metal amorphous alloy, a TbFeCo alloy may be employed. The cover layer 13 serves to physically and chemically protect the recording layer 12 from the external environment, and may be constituted of SiN, $SiO_2$, or a diamond-like carbon. The stacked structure of the magnetic disk 10 may include an additional layer where appropriate. The magnetic disk 10 is supported by a spindle motor (not shown), to be rotationally driven by the rotation of the spindle motor.

The magnetic head 20 includes a slider body 21, a recording element 22, and a reproducing element 23, and is disposed so as to face the recording layer 12 of the magnetic disk 10, when the magnetic disk apparatus X1 records or reproduces information. The slider body 21 has a predetermined shape so as to cause gas lubrication between the magnetic disk 10 and the magnetic head 20, when the linear speed of a point on the rotating magnetic disk 10 facing the magnetic head 20 exceeds a predetermined level. The recording element 22 serves to apply a recording magnetic field M of a predetermined intensity to the recording layer 12, and includes a coil through which a current for generating a magnetic field is supplied, and a magnetic pole that converts the generated magnetic field into a more intense magnetic field. The intensity of the magnetic field by the recording element 22 and the timing for applying the magnetic field are controlled based on a predetermined control signal from a control unit, which is not shown. The reproducing element 23 serves to detect a magnetic signal generated according to a magnetized status of the recording layer 12 and to convert the magnetic signal into an electrical signal, and is constituted of a GMR device or a MR device. The magnetic head 20 thus constituted is connected to a magnetic head actuator (not shown) constituted of for example a voice coil motor, via a suspension arm, for example made of a leaf spring. The suspension arm serves to bias the magnetic head 20 against the magnetic disk 10.

The optical head 30 is constituted as an optical pickup device, and includes a condenser lens 31, a lens actuator 32, a mask 33, and a mirror 34. The optical head 30 encloses therein an optical waveguide that transmits a laser beam L from a light source (not shown) such as a semiconductor laser diode. For the sake of simplification of the drawing, the laser beam L employed in this embodiment is schematically indicated by a single-dot chain line representing the optical axis thereof. The condenser lens 31 serves to converge the laser beam L and emit the converged beam to the magnetic disk 10. The lens actuator 32 adjusts the position of the condenser lens 31 in a vertical direction in FIG. 1 for example by an electromagnetic driving force, thus to adjust the focal point of the laser beam converged by the condenser lens 31. The movement of the lens actuator 32 is controlled based on a predetermined control signal from a control unit (not shown). The mask 33 serves to adjust a spot diameter of the beam spot formed by the laser beam on the surface of the magnetic disk 10. The mirror 34 reflects the laser beam L emitted by the light source (not shown) and transmitted through a predetermined passage, toward the condenser lens 31 inside the optical head 30. The optical head 30 thus constituted is installed so as to translationally move driven by an optical head actuator (not shown) along a guiderail (not shown) installed so as to extend radially of the magnetic disk 10.

The composite element 40 includes a plurality of prisms of different refractive indices, so as to incline the incident angle of the laser beam L, emitted by the light source (not shown) and transmitted through a collimator lens (not shown) on the composite element 40, to thereby trim the cross-sectional shape of the laser beam L into a circle for example, and to serve as a polarizing beam splitter for splitting the laser beam L. A portion of the laser beam L thus split is led to the optical head 30, and the other portion is led to a photodetecting unit (not shown) that monitors the intensity of the laser beam L to execute a feedback control.

When recording information with the magnetic disk apparatus X1 on the magnetic disk 10, by the thermally assisted magnetic recording method according to the first embodiment of the present invention, the magnetic head actuator disposes the magnetic head 20 so as to float above the magnetic disk 10 and sets the magnetic head 20 at the recording position, with the magnetic disk 10 being rotated at a predetermined constant speed, while the optical head actuator sets the optical head at the recording position. The relative moving direction of the magnetic head 20 and the optical head 30 with respect to the rotating magnetic disk 10 is indicated by the arrow D.

Figure 2:
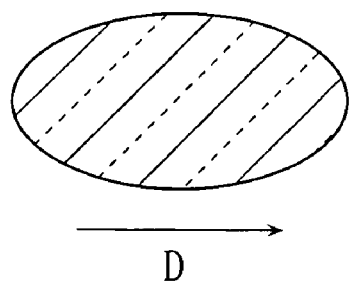
FIG. 2 is a schematic cross-sectional view of a laser beam employed in the first embodiment.
Figure 3:
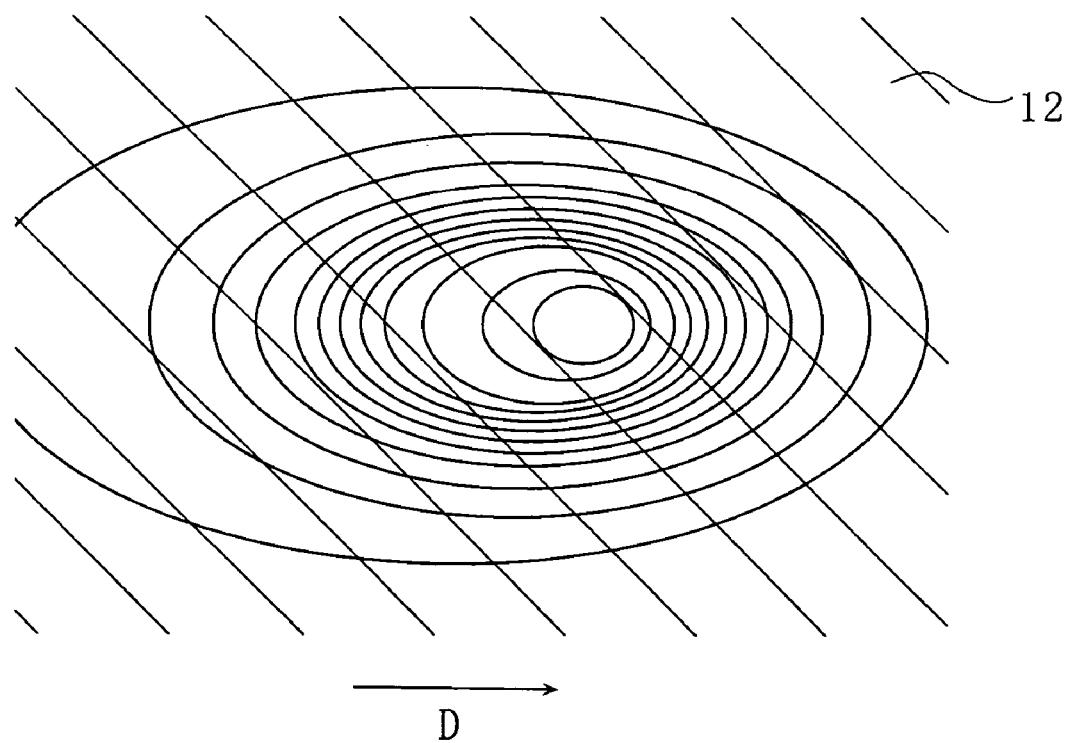
FIG. 3 is graphic diagram showing a temperature distribution created by the thermally assisted magnetic recording method according to the first embodiment.
Figure 4:
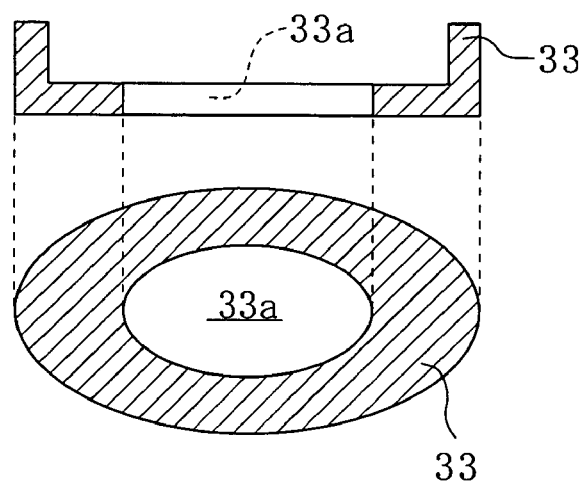
FIG. 4 includes a schematic cross-sectional view and a plan view showing a mask that may be employed for shaping the laser beam in the first embodiment.

According to the thermally assisted magnetic recording method, the laser beam L of a predetermined power converged through the condenser lens 31 of the optical head 30 is continuously emitted onto the recording layer 12 of the magnetic disk 10. In this embodiment, the laser beam L has an elliptical cross-sectional shape with the major axis oriented along the arrow D (substantially circumferentially of the disk or in the extending direction of the track) as shown in FIG. 2. Accordingly, the heated region (region enclosed in an isotherm of a significantly higher temperature predetermined from the viewpoint of the effectiveness of the thermally assisted magnetic recording method) formed on the recording layer 12 by irradiation with the laser beam has a shape elongated in the direction of the arrow D. FIG. 3 is graphic diagram showing a temperature distribution created by the laser beam irradiation on the recording layer 12, in this embodiment. In FIG. 3, the inner ellipses represent the isotherms of higher temperatures. Referring to the mask 33, employing a mask having an elliptical opening 33a as shown in FIG. 4 enables trimming the laser beam L so as to have an elliptical cross-sectional shape, elongated in the direction of the arrow D. Alternatively, the composite element 40 may be provided with an incident surface oriented at a predetermined angle so as to trim the cross-sectional shape of the laser beam into an ellipse of a predetermined aspect ratio, so that the laser beam L is emitted onto the incident surface at an angle specifically predetermined for that surface. Such arrangement can also trim the laser beam L in an elliptical cross-sectional shape elongated in the direction of the arrow D.

In this thermally assisted magnetic recording method, the recording element 22 in the magnetic head 20 applies a recording magnetic field M to the heated region on the recording layer 12, while the recording layer 12 is locally heated as described above. Also, the direction of the recording magnetic field M output by the recording element 22 is sequentially inverted, so as to form on the recording layer 12 a plurality of magnetic domains (record marks) having sequentially inverted magnetizing directions, aligned circumferentially of the magnetic disk 10 or in the extending direction of the track. At this stage, the timing for inverting the recording magnetic field M is controlled so as to form each record mark in a predetermined length.

By this thermally assisted magnetic recording method, in a word, the laser beam L is emitted onto the recording layer 12 of the magnetic disk 10 such that the irradiated spot moves on the recording layer 12, so as to form the locally heated region which moves on the recording layer 12, and the recording magnetic field M is applied to the heated region, so that information is recorded.

By the thermally assisted magnetic recording method thus arranged, the heated region formed on the recording layer 12 by the laser beam irradiation obtains a shape elongated in the direction of the arrow D (moving direction of the heated region), i.e. along the extending direction of the track. Here, by a thermally assisted magnetic recording method in general, a maximum attainable temperature of a region on the track on the recording layer, to be heated and subjected to application of the recording magnetic field for formation of a record mark, primarily depends on a total amount of the heating energy supplied thereto per a predetermined minute time. Based on this, the method of forming the heated region in a shape elongated in the moving direction thereof is quite advantageous for supplying a sufficient amount of heating energy (originating from the laser beam in this method) to the region on the recording layer 12 where the record mark is to be formed, while restraining the heat from spreading transversely of the track. The thermally assisted magnetic recording method according to this embodiment is, therefore, advantageous in inhibiting or restraining emergence of the cross-write effect, so as to increase the recording density of the track.

Figure 5:
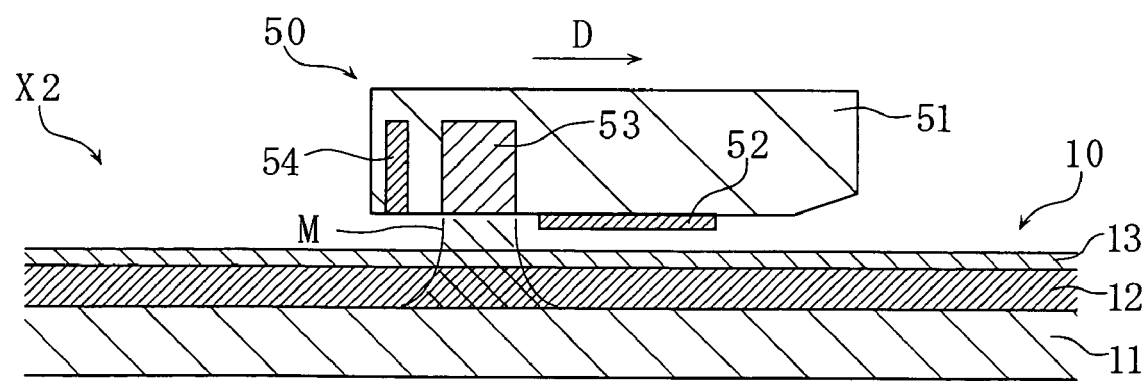
FIG. 5 is a schematic diagram showing a part of a magnetic disk apparatus for executing a thermally assisted magnetic recording method according to a second embodiment of the present invention.

FIG. 5 is a schematic diagram showing a part of a magnetic disk apparatus X2 for executing a thermally assisted magnetic recording method according to a second embodiment of the present invention. The magnetic disk apparatus X2 includes a magnetic disk 10 and a recording/reproducing head 50, for recording and reproducing information on and from the magnetic disk 10, by the thermally assisted magnetic recording method.

The magnetic disk 10 has a stacked structure including a disk substrate 11, a recording layer 12, and a cover layer 13, so as to serve as a magnetic recording medium under the thermally assisted magnetic recording system. The materials constituting the magnetic disk 10 are the same as those employed in the first embodiment.

Figure 6:
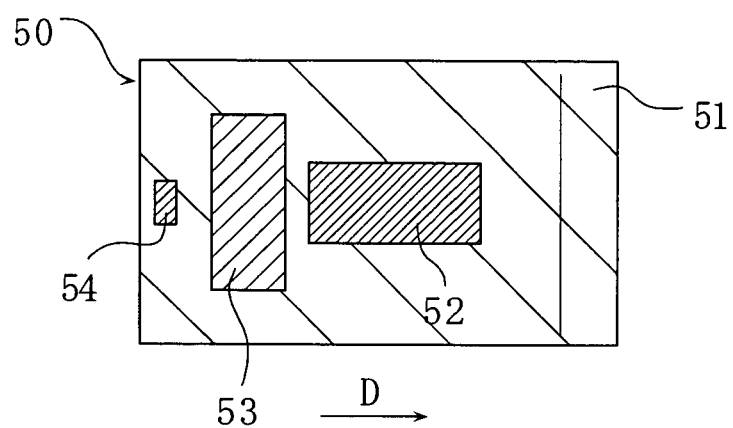
FIG. 6 is a plan view showing a side of a recording/reproducing head facing the magnetic disk of the magnetic disk apparatus of FIG. 5.

The recording/reproducing head 50 includes a slider body 51, a heating element 52, a recording element 53, and a reproducing element 54, and is disposed so as to face the recording layer 12 of the magnetic disk 10, when the magnetic disk apparatus X2 records or reproduces information. The slider body 51 has a predetermined shape so as to cause gas lubrication between the magnetic disk 10 and the recording/reproducing head 50, when the linear speed of a point on the rotating magnetic disk 10 facing the recording/reproducing head 50 exceeds a predetermined level. The heating element 52 is a medium heater in the thermally assisted magnetic recording system, and generates heat when a current is supplied. The temperature of the heating element 52 can be controlled by a control unit, which is not shown. The heating element 52 is installed on the side of the slider body 51 facing the medium, and has a shape elongated in a direction of an arrow D to be described later, as shown in FIG. 6. FIG. 6 is a plan view showing a side of a recording/reproducing head 50 facing the magnetic disk 10. The recording element 53 serves to apply a recording magnetic field M of a predetermined intensity to the recording layer 12, and the reproducing element 54 serves to detect a magnetic signal generated according to a magnetized status of the recording layer 12, and to convert the magnetic signal into an electrical signal. The materials constituting the recording element 53 and the reproducing element 54 are the same as those of the recording element 22 and the reproducing element 23 of the first embodiment. The heating element 52, the recording element 53, and the reproducing element 54 are aligned in a row along the rotating direction of the magnetic disk 10 or a circumferential direction thereof, for example in a manner as shown in FIG. 6. The recording/reproducing head 50 thus constituted is connected to a recording/reproducing head actuator (not shown) constituted of for example a voice coil motor, via a suspension arm, for example made of a leaf spring. The suspension arm serves to bias the recording/reproducing head 50 against the magnetic disk 10.

When recording information with the magnetic disk apparatus X2 on the magnetic disk 10, by the thermally assisted magnetic recording method according to the second embodiment of the present invention, the recording/reproducing head actuator disposes the recording/reproducing head 50 so as to float above the magnetic disk 10 and sets the recording/reproducing head 50 at the recording position, with the magnetic disk 10 being rotated at a predetermined constant speed. The relative moving direction of the recording/reproducing head 50 with respect to the rotating magnetic disk 10 is indicated by the arrow D.

In this thermally assisted magnetic recording method, the heating element 52 of the recording/reproducing head 50 is disposed so as to face the recording layer 12, and continuously generates heat at a predetermined temperature. In this embodiment, the heating element 52 has a shape elongated in the direction of the arrow D (substantially circumferentially of the disk or in the extending direction of the track) as shown in FIG. 6, and hence the heated region formed on the recording layer 12 by the heat ray from the heating element 52 has a shape elongated in the direction of the arrow D, as the heated region described above referring to FIG. 3.

In this thermally assisted magnetic recording method, the recording element 53 in the recording/reproducing head 50 applies a recording magnetic field M to the heated region on the recording layer 12, while the recording layer 12 is locally heated as described above. Also, the direction of the recording magnetic field M output by the recording element 22 is sequentially inverted, so as to form on the recording layer 12 a plurality of magnetic domains (record marks) having sequentially inverted magnetizing directions, aligned circumferentially of the magnetic disk 10 or in the extending direction of the track. At this stage, the timing for inverting the recording magnetic field M is controlled so as to form each record mark in a predetermined length.

By this thermally assisted magnetic recording method, in a word, the heating element 52 is disposed so as to face the recording layer 12 of the magnetic disk 10 so as to form the locally heated higher temperature region which moves on the recording layer 12, and the recording magnetic field M is applied to the heated region, so that information is recorded.

By the thermally assisted magnetic recording method thus arranged, the heated region formed on the recording layer 12 by the heating element 52 facing the recording layer 12 obtains a shape elongated in the direction of the arrow D (moving direction of the heated region), i.e. along the extending direction of the track. Whereas, as already stated, by a thermally assisted magnetic recording method, a maximum attainable temperature of a region on the recording layer, where the record mark is to be formed, primarily depends on a total amount of the heating energy supplied thereto per a predetermined minute time. Based on this, the method of forming the heated region in a shape elongated in the moving direction thereof is quite advantageous for supplying a sufficient amount of heating energy (originating from the heating element 52 in this method) to the region on the recording layer 12 where the record mark is to be formed, while restraining the heat from spreading transversely of the track. The thermally assisted magnetic recording method according to this embodiment is, therefore, advantageous in inhibiting or restraining emergence of the cross-write effect, so as to increase the recording density of the track.

Figure 7:
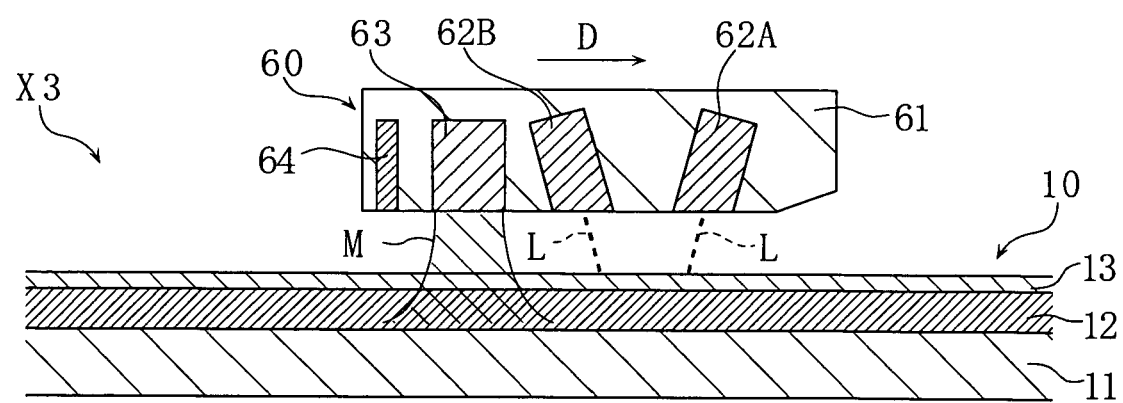
FIG. 7 is a schematic diagram showing a part of a magnetic disk apparatus for executing a thermally assisted magnetic recording method according to a third embodiment of the present invention.

FIG. 7 is a schematic diagram showing a part of a magnetic disk apparatus X3 for executing a thermally assisted magnetic recording method according to a third embodiment of the present invention. The magnetic disk apparatus X3 includes a magnetic disk 10 and a recording/reproducing head 60, for recording and reproducing information on and from the magnetic disk 10, by the thermally assisted magnetic recording method.

The magnetic disk 10 has a stacked structure including a disk substrate 11, a recording layer 12, and a cover layer 13, so as to serve as a magnetic recording medium under the thermally assisted magnetic recording system. The materials constituting the magnetic disk 10 are the same as those employed in the first embodiment.

The recording/reproducing head 60 includes a slider body 61, laser elements 62A, 62B, a recording element 63, and a reproducing element 64, and is disposed so as to face the recording layer 12 of the magnetic disk 10, when the magnetic disk apparatus X3 records or reproduces information. The slider body 61 has a predetermined shape so as to cause gas lubrication between the magnetic disk 10 and the recording/reproducing head 60, when the linear speed of a point on the rotating magnetic disk 10 facing the recording/reproducing head 60 exceeds a predetermined level. The laser elements 62A, 62B are medium heaters in the thermally assisted magnetic recording system, and includes a semiconductor laser module (light source) that emits the laser beam L when a voltage is applied, and so called an optical waveguide that leads the laser beam L from the laser module to the recording/reproducing head 60. The laser elements 62A, 62B are disposed so as to emit the laser beam L from the side of the slider body 61 facing the medium, such that the two laser beams L overlap with each other on the surface of the magnetic disk 10. For the sake of simplification of the drawing, the laser beam L employed in this embodiment is schematically indicated by a single-dot chain line representing the optical axis thereof. The power of the laser beam L emitted by the laser elements 62A, 62B can be controlled by a control unit, which is not shown. The recording element 63 serves to apply a recording magnetic field M of a predetermined intensity to the recording layer 12, and the reproducing element 64 serves to detect a magnetic signal generated according to a magnetized status of the recording layer 12, and to convert the magnetic signal into an electrical signal. The materials constituting the recording element 63 and the reproducing element 64 are the same as those of the recording element 22 and the reproducing element 23 of the first embodiment. The laser elements 62A, 62B, the recording element 63, and the reproducing element 64 are aligned in a row along the rotating direction of the magnetic disk 10 or a circumferential direction thereof. The recording/reproducing head 60 thus constituted is connected to a recording/reproducing head actuator (not shown) constituted of for example a voice coil motor, via a suspension arm, for example made of a leaf spring. The suspension arm serves to bias the recording/reproducing head 60 against the magnetic disk 10.

When recording information with the magnetic disk apparatus X3 on the magnetic disk 10, by the thermally assisted magnetic recording method according to the third embodiment of the present invention, the recording/reproducing head actuator disposes the recording/reproducing head 60 so as to float above the magnetic disk 10 and sets the recording/reproducing head 60 at the recording position, with the magnetic disk 10 being rotated at a predetermined constant speed. The relative moving direction of the recording/reproducing head 60 with respect to the rotating magnetic disk 10 is indicated by the arrow D.

Figure 8:
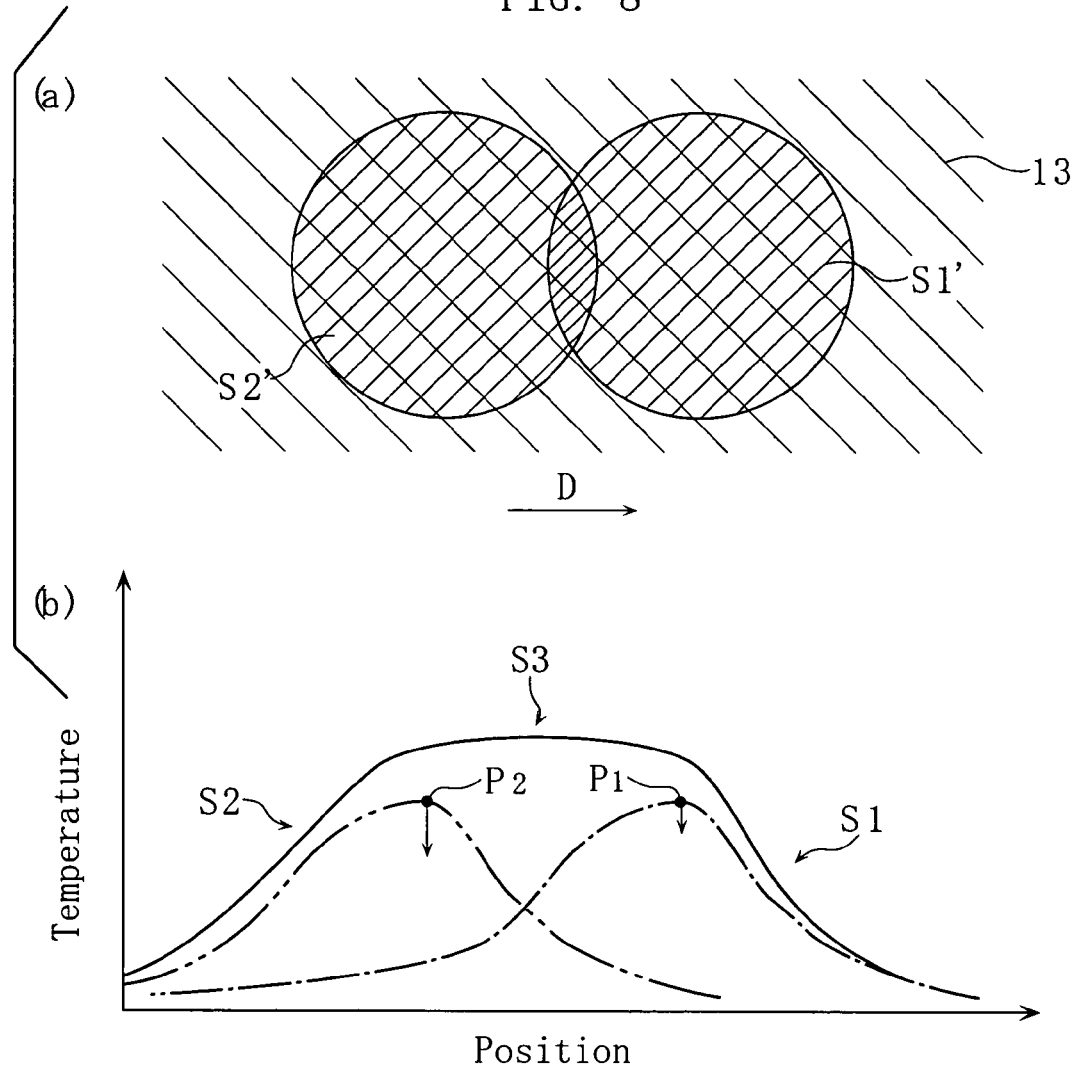

In this thermally assisted magnetic recording method, the two laser beams L emitted by the laser elements 62A, 62B are continuously made incident upon the recording layer 12 of the magnetic disk 10. In this embodiment, the two laser beams L overlap with each other on the surface of the magnetic disk 10 or the cover layer 13, so as to form two beam spots S1', S2' aligned in the direction of the arrow D (substantially circumferentially of the disk or in the extending direction of the track) on the cover layer 13, as shown in FIG. 8(a). On predetermined positions on the recording layer 12, two heated spots S1, S2 having a temperature distribution as shown in the graph of FIG. 8(b) are formed, so as to respectively correspond to the two beam spots S1', S2'. In FIG. 8(b), the horizontal axis represents the position in the circumferential direction of the magnetic disk 10, and the vertical axis represents the temperature. The graph of FIG. 8(b) also indicates by a single-dot chain line a temperature distribution in the heated spot S1 formed on the recording layer 12 when the beam spot S2', hence the heated spot S2 is not formed, and by a double-dot chain line a temperature distribution in the heated spot S2 formed on the recording layer 12 when the beam spot S1', hence the heated spot S1 is not formed. The solid line in FIG. 8(b) represents the temperature distribution of the heated region S3 composed of the heated spots S1, S2.

In this thermally assisted magnetic recording method, the recording element 63 in the recording/reproducing head 60 applies a recording magnetic field M to the heated region S3 on the recording layer 12, while the recording layer 12 is locally heated as described above. Also, the direction of the recording magnetic field M output by the recording element 63 is sequentially inverted, so as to form on the recording layer 12 a plurality of magnetic domains (record marks) having sequentially inverted magnetizing directions, aligned circumferentially of the magnetic disk 10 or in the extending direction of the track. At this stage, the timing for inverting the recording magnetic field M is controlled so as to form each record mark in a predetermined length.

By this thermally assisted magnetic recording method, the locally heated higher temperature region S3 that moves on the recording layer 12 of the magnetic disk 10 is formed as described above, and the recording magnetic field M is applied to the heated region S3, so that information is recorded.

By the thermally assisted magnetic recording method thus arranged, the heated region S3 composed of the two aligned heated spots S1, S2 is formed in a shape elongated in the direction of the arrow D (moving direction of the heated region), i.e. along the extending direction of the track. Whereas, as already stated, by a thermally assisted magnetic recording method, a maximum attainable temperature of a region on the recording layer, where the record mark is to be formed, primarily depends on a total amount of the heating energy supplied thereto per a predetermined minute time. Based on this, the method of forming the heated region S3 in a shape elongated in the moving direction thereof is quite advantageous for supplying a sufficient amount of heating energy to the region on the recording layer 12 where the record mark is to be formed, while restraining the heat from spreading transversely of the track. The thermally assisted magnetic recording method according to this embodiment is, therefore, advantageous in inhibiting or restraining emergence of the cross-write effect, so as to increase the recording density of the track.

In this thermally assisted magnetic recording method, the peak temperatures $P_1$, $P_2$ of the heated spots S1, S2 shown in FIG. 8(b) may be controlled according to the moving speed of the heated region S3. In this method, provided that the disk rotation speed and the irradiation power of the laser beam L are constant irrespective of a radial position of the spot on the recording layer 12 where information is to be recorded, the heated region S3 moves slower as the track on which the information is being recorded comes to an inner position of the magnetic disk 10. Accordingly, it is preferable to control the power of the laser beams L output by the laser elements 62A, 62B such that the peak temperatures $P_1$, $P_2$ of the heated spots S1, S2 both drop, and a ratio of the peak temperature $P_2$ of the subsequent heated spot S2 with respect to the peak temperature $P_1$ of the first heated spot S1 becomes smaller, as the track on which the information is being recorded comes to an inner position of the magnetic disk 10 (i.e. the slower the heated region S3 moves). The downwardly oriented arrows in FIG. 8(b) indicate a variation of the peak temperatures $P_1$, $P_2$. Controlling thus the peak temperatures $P_1$, $P_2$ of the heated spots S1, S2 composing the heated region S3 allows leveling off the heating energy amount supplied to the track per unit time, irrespective of the radial position of the track on the disk.

Figure 9:
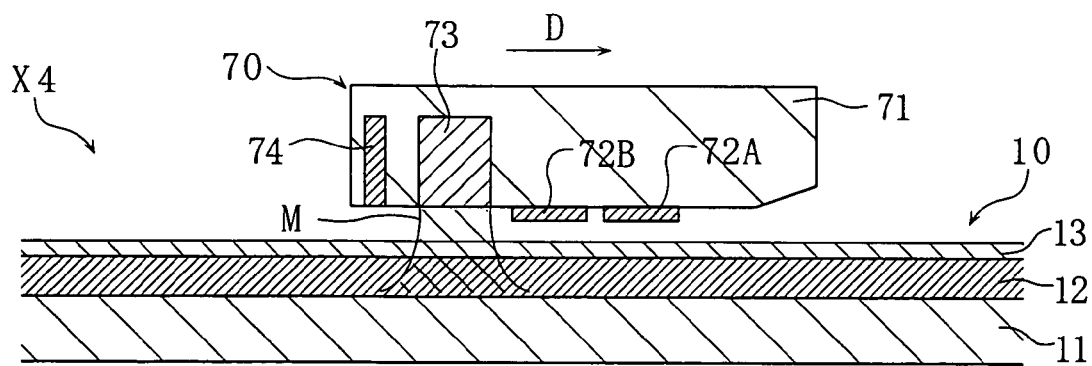
FIG. 9 is a schematic diagram showing a part of a magnetic disk apparatus for executing a thermally assisted magnetic recording method according to a fourth embodiment of the present invention.

FIG. 9 is a schematic diagram showing a part of a magnetic disk apparatus X4 for executing a thermally assisted magnetic recording method according to a fourth embodiment of the present invention. The magnetic disk apparatus X4 includes a magnetic disk 10 and a recording/reproducing head 70, for recording and reproducing information on and from the magnetic disk 10, by the thermally assisted magnetic recording method.

The magnetic disk 10 has a stacked structure including a disk substrate 11, a recording layer 12, and a cover layer 13, so as to serve as a magnetic recording medium under the thermally assisted magnetic recording system. The materials constituting the magnetic disk 10 are the same as those employed in the first embodiment.

Figure 10:
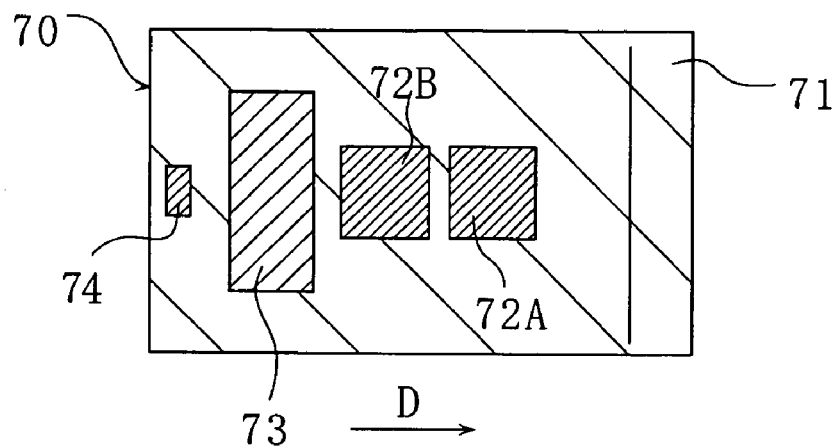
FIG. 10 is a plan view showing a side of a recording/reproducing head facing the magnetic disk of the magnetic disk apparatus of FIG. 9.

The recording/reproducing head 70 includes a slider body 71, heating elements 72A, 72B, a recording element 73, and a reproducing element 74, and is disposed so as to face the recording layer 12 of the magnetic disk 10, when the magnetic disk apparatus X4 records or reproduces information. The slider body 71 has a predetermined shape so as to cause gas lubrication between the magnetic disk 10 and the recording/reproducing head 70, when the linear speed of a point on the rotating magnetic disk 10 facing the recording/reproducing head 70 exceeds a predetermined level. The heating elements 72A, 72B are medium heaters in the thermally assisted magnetic recording system, and generate heat when a current is supplied. The temperature of the heating elements 72A, 72B can be controlled by a control unit, which is not shown. The heating elements 72A, 72B are installed on the side of the slider body 71 facing the medium. The recording element 73 serves to apply a recording magnetic field M of a predetermined intensity to the recording layer 12, and the reproducing element 74 serves to detect a magnetic signal generated according to a magnetized status of the recording layer 12, and to convert the magnetic signal into an electrical signal. The materials constituting the recording element 73 and the reproducing element 74 are the same as those of the recording element 22 and the reproducing element 23 of the first embodiment. The heating element 72A, 72B, the recording element 73, and the reproducing element 74 are aligned in a row along the rotating direction of the magnetic disk 10 or a circumferential direction thereof, for example in a manner as shown in FIG. 10. FIG. 10 is a plan view showing a side of a recording/reproducing head 70 facing the magnetic disk 10. The recording/reproducing head 70 thus constituted is connected to a recording/reproducing head actuator (not shown) constituted of for example a voice coil motor, via a suspension arm, for example made of a leaf spring. The suspension arm serves to bias the recording/reproducing head 70 against the magnetic disk 10.

When recording information with the magnetic disk apparatus X4 on the magnetic disk 10, by the thermally assisted magnetic recording method according to the fourth embodiment of the present invention, the recording/reproducing head actuator disposes the recording/reproducing head 70 so as to float above the magnetic disk 10 and sets the recording/reproducing head 70 at the recording position, with the magnetic disk 10 being rotated at a predetermined constant speed. The relative moving direction of the recording/reproducing head 70 with respect to the rotating magnetic disk 10 is indicated by the arrow D.

Figure 11:
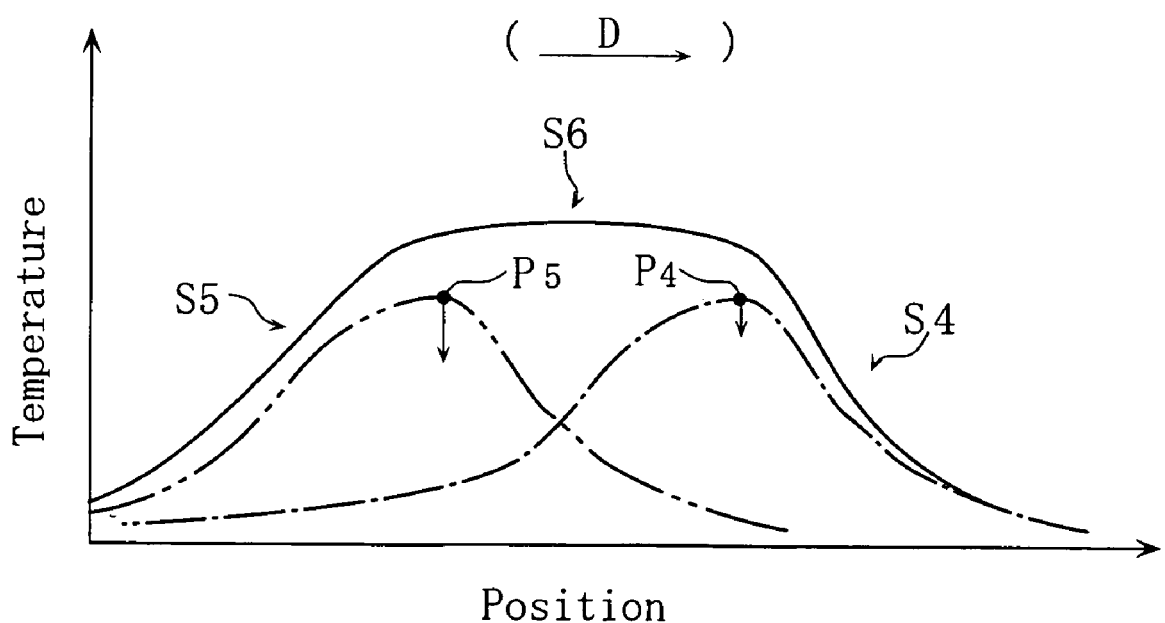
FIG. 11 is a graph showing a temperature distribution on the recording layer created by the thermally assisted magnetic recording method according to the fourth embodiment.

In this thermally assisted magnetic recording method, the heating elements 72A, 72B of the recording/reproducing head 70 are disposed so as to face the recording layer 12, and continuously generate heat at a predetermined temperature. In this embodiment, the heating elements 72A, 72B are aligned in the direction of the arrow D (substantially circumferentially of the disk or in the extending direction of the track) as shown in FIG. 10, so that the heat of the heating elements 72A, 72B forms two heated spots S4, S5 having a temperature distribution as shown in the graph of FIG. 11. In FIG. 11, the horizontal axis represents the position in the circumferential direction of the magnetic disk 10, and the vertical axis represents the temperature. The graph of FIG. 11 also indicates by a single-dot chain line a temperature distribution in the heated spot S4 formed on the recording layer 12, when the heating element 72B does not generate heat and hence the heated spot S5 is not formed, and by a double-dot chain line a temperature distribution in the heated spot S5 formed on the recording layer 12, when the heating element 72A does not generate heat and hence the heated spot S4 is not formed. The solid line in FIG. 11 represents the temperature distribution of the heated region S6 composed of the heated spots S4, S5.

In this thermally assisted magnetic recording method, the recording element 73 in the recording/reproducing head 70 applies a recording magnetic field M to the heated region S6 on the recording layer 12, while the recording layer 12 is locally heated as described above. Also, the direction of the recording magnetic field M output by the recording element 73 is sequentially inverted, so as to form on the recording layer 12 a plurality of magnetic domains (record marks) having sequentially inverted magnetizing directions, aligned circumferentially of the magnetic disk 10 or in the extending direction of the track. At this stage, the timing for inverting the recording magnetic field M is controlled so as to form each record mark in a predetermined length.

By this thermally assisted magnetic recording method, the locally heated higher temperature region S6 that moves on the recording layer 12 of the magnetic disk 10 is formed as described above, and the recording magnetic field M is applied to the heated region S6, so that information is recorded.

By the thermally assisted magnetic recording method thus arranged, the heated region S6 composed of the two aligned heated spots S4, S5 is formed in a shape elongated in the direction of the arrow D (moving direction of the heated region), i.e. along the extending direction of the track. Whereas, as already stated, by a thermally assisted magnetic recording method, a maximum attainable temperature of a region on the recording layer, where the record mark is to be formed, primarily depends on a total amount of the heating energy supplied thereto per a predetermined minute time. Based on this, the method of forming the heated region S6 in a shape elongated in the moving direction thereof is quite advantageous for supplying a sufficient amount of heating energy to the region on the recording layer 12 where the record mark is to be formed, while restraining the heat from spreading transversely of the track. The thermally assisted magnetic recording method according to this embodiment is, therefore, advantageous in inhibiting or restraining emergence of the cross-write effect, so as to increase the recording density of the track.

In this thermally assisted magnetic recording method, the peak temperatures $P_4$, $P_5$ of the heated spots S4, S5 shown in FIG. 11 may be controlled according to the moving speed of the heated region S6. In this method, provided that the disk rotation speed and the irradiation power of the laser beam L are constant irrespective of a radial position of the spot on the recording layer 12 where information is to be recorded, the heated region S6 moves slower as the track on which the information is being recorded comes to an inner position of the magnetic disk 10. Accordingly, it is preferable to control the power of the laser beams L output by the laser elements 72A, 72B such that the peak temperatures $P_4$, $P_5$ of the heated spots S4, S5 both drop, and a ratio of the peak temperature $P_5$ of the subsequent heated spot S5 with respect to the peak temperature $P_4$ of the first heated spot S4 becomes smaller, as the track on which the information is being recorded comes to an inner position of the magnetic disk 10 (i.e. the slower the heated region S6 moves). The downwardly oriented arrows in FIG. 11 indicate a variation of the peak temperatures $P_4$, $P_5$. Controlling thus the peak temperatures $P_4$, $P_5$ of the heated spots S4, S5 composing the heated region S6 allows leveling off the heating energy amount supplied to the track per unit time, irrespective of the radial position of the track on the disk.

Figure 12:
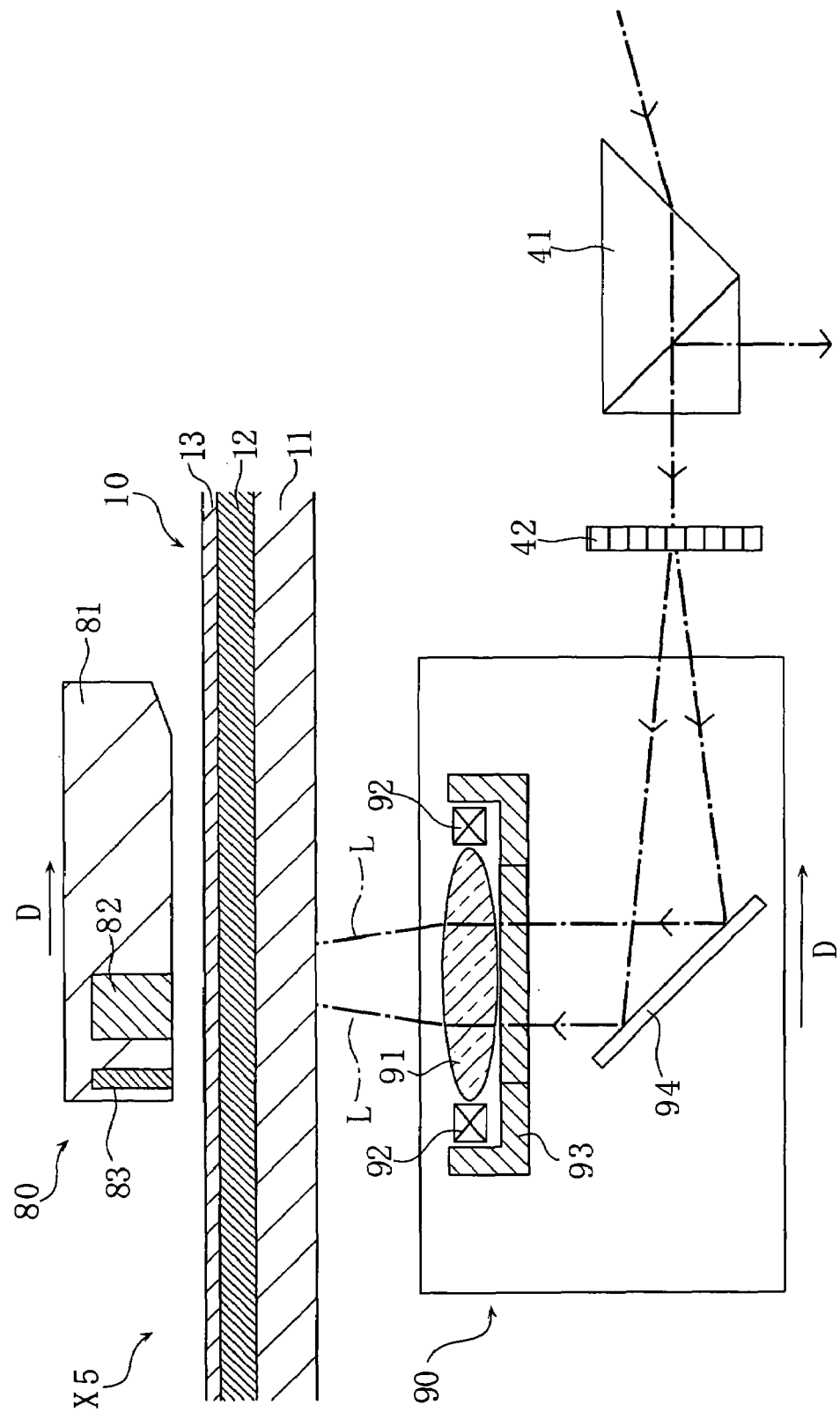
FIG. 12 is a schematic diagram showing a part of a magnetic disk apparatus for executing a thermally assisted magnetic recording method according to a fifth embodiment of the present invention.

FIG. 12 is a schematic diagram showing a part of a magnetic disk apparatus X5 for executing a thermally assisted magnetic recording method according to a fifth embodiment of the present invention. The magnetic disk apparatus X5 includes a magnetic disk 10, a magnetic head 80, an optical head 90, a composite element 41, and a diffraction grid 42, for recording and reproducing information on and from the magnetic disk 10, by the thermally assisted magnetic recording method.

The magnetic disk 10 has a stacked structure including a disk substrate 11, a recording layer 12, and a cover layer 13, so as to serve as a magnetic recording medium under the thermally assisted magnetic recording system. The materials constituting the magnetic disk 10 are the same as those employed in the first embodiment.

The magnetic head 80 includes a slider body 81, a recording element 82, and a reproducing element 83, and is disposed so as to face the recording layer 12 of the magnetic disk 10, when the magnetic disk apparatus X5 records or reproduces information. The materials constituting the slider body 81, the recording element 82, and the reproducing element 83 are the same as those of the slider body 21, the recording element 22, and the reproducing element 23 of the first embodiment. The magnetic head 80 thus constituted is connected to a magnetic head actuator (not shown) constituted of for example a voice coil motor, via a suspension arm, for example made of a leaf spring. The suspension arm serves to bias the magnetic head 80 against the magnetic disk 10.

The optical head 90 includes a condenser lens 91, a lens actuator 92, a mask 93, and a mirror 94, and is capable of emitting a plurality of laser beams L (two in this embodiment) toward the magnetic disk 10. For the sake of simplification of the drawing, the laser beam L employed in this embodiment is schematically indicated by a single-dot chain line representing the optical axis thereof. The optical head 90 encloses therein an optical waveguide that transmits a laser beam L from a light source (not shown) such as a semiconductor laser diode. The materials of the condenser lens 91, the lens actuator 92, the mask 93, and the mirror 94 are the same as those of the condenser lens 31, the lens actuator 32, the mask 33, and the mirror 34 of the first embodiment. The optical head 90 thus constituted is installed so as to translationally move driven by an optical head actuator (not shown) along a guiderail (not shown) installed so as to extend radially of the magnetic disk 10.

The composite element 41 includes a plurality of prisms of different refractive indices, so as to incline the incident angle of the laser beam L, emitted by the light source (not shown) and transmitted through a collimator lens (not shown), on the composite element 41, to thereby trim the cross-sectional shape of the laser beam L into a circle for example, and to serve as a polarizing beam splitter for splitting the laser beam L. A portion of the laser beam L thus split is led to the optical head 90, and the other portion is led to a photodetecting unit (not shown) that monitors the intensity of the laser beam L to execute a feedback control.

The diffraction grid 42 serves to split a laser beam L from a single light source into two beams, in various splitting manners through a control of a predetermined actuator that microadjusts the position and the rotation angle (posture) of the diffraction grid 42.

When recording information with the magnetic disk apparatus X5 on the magnetic disk 10, by the thermally assisted magnetic recording method according to the fifth embodiment of the present invention, the magnetic head actuator disposes the magnetic head 80 so as to float above the magnetic disk 10 and sets the magnetic head 80 at the recording position, with the magnetic disk 10 being rotated at a predetermined constant speed, while the optical head actuator sets the optical head 90 at the recording position. The relative moving direction of the magnetic head 80 and the optical head 90 with respect to the rotating magnetic disk 10 is indicated by the arrow D.

Figure 13:
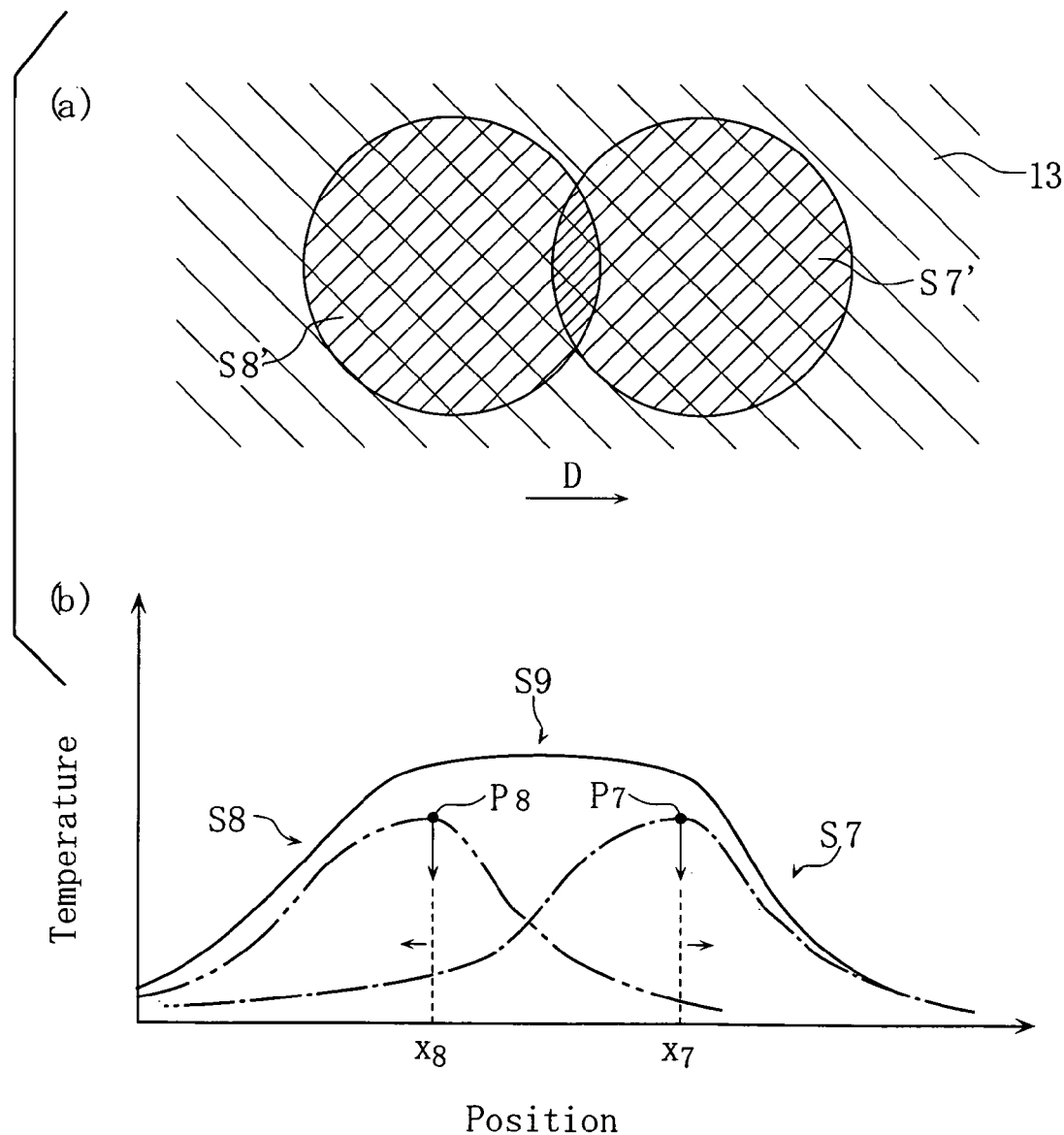

In this thermally assisted magnetic recording method, the two laser beams L emitted by the optical head 90 and converged through the condenser lens 91 are continuously made incident upon the recording layer 12 of the magnetic disk 10. In this embodiment, the two laser beams L overlap with each other on the surface of the magnetic disk 10 or the cover layer 13, so as to form two beam spots S7', S8' aligned in the direction of the arrow D (substantially circumferentially of the disk or in the extending direction of the track) on the cover layer 13, as shown in FIG. 13(a). On predetermined positions on the recording layer 12, two heated spots S7, S8 having a temperature distribution as shown in the graph of FIG. 13(b) are formed, so as to respectively correspond to the two beam spots S7', S8'. In FIG. 13(b), the horizontal axis represents the position in the circumferential direction of the magnetic disk 10, and the vertical axis represents the temperature. The graph of FIG. 13(b) also indicates by a single-dot chain line a temperature distribution in the heated spot S7 formed on the recording layer 12 when the beam spot S8', hence the heated spot S8 is not formed, and by a double-dot chain line a temperature distribution in the heated spot S8 formed on the recording layer 12 when the beam spot S7', hence the heated spot S7 is not formed. The solid line in FIG. 13(b) represents the temperature distribution of the heated region S9 composed of the heated spots S7, S8.

In this thermally assisted magnetic recording method, the recording element 82 in the magnetic head 80 applies a recording magnetic field M to the heated region S9 on the recording layer 12, while the recording layer 12 is locally heated as described above. Also, the direction of the recording magnetic field M output by the recording element 82 is sequentially inverted, so as to form on the recording layer 12 a plurality of magnetic domains (record marks) having sequentially inverted magnetizing directions, aligned circumferentially of the magnetic disk 10 or in the extending direction of the track. At this stage, the timing for inverting the recording magnetic field M is controlled so as to form each record mark in a predetermined length.

By this thermally assisted magnetic recording method, the locally heated higher temperature region S9 that moves on the recording layer 12 of the magnetic disk 10 is formed as described above, and the recording magnetic field M is applied to the heated region S9, so that information is recorded.

By the thermally assisted magnetic recording method thus arranged, the heated region S9 composed of the two aligned heated spots S7, S8 is formed in a shape elongated in the direction of the arrow D (moving direction of the heated region), i.e. along the extending direction of the track. Whereas, as already stated, by a thermally assisted magnetic recording method, a maximum attainable temperature of a region on the recording layer, where the record mark is to be formed, primarily depends on a total amount of the heating energy supplied thereto per a predetermined minute time. Based on this, the method of forming the heated region S9 in a shape elongated in the moving direction thereof is quite advantageous for supplying a sufficient amount of heating energy to the region on the recording layer 12 where the record mark is to be formed, while restraining the heat from spreading transversely of the track. The thermally assisted magnetic recording method according to this embodiment is, therefore, advantageous in inhibiting or restraining emergence of the cross-write effect, so as to increase the recording density of the track.

In this thermally assisted magnetic recording method, the peak temperatures $P_7$, $P_8$ of the heated spots S7, S8 may be controlled according to the moving speed of the heated region S9. In this method, provided that the disk rotation speed and the irradiation power of the laser beam L are constant irrespective of a radial position of the spot on the recording layer 12 where information is to be recorded, the heated region S9 moves slower as the track on which the information is being recorded comes to an inner position of the magnetic disk 10. Accordingly, it is preferable to control the power of the laser beams L such that the peak temperatures $P_7$, $P_8$ of the heated spots S7, S8 both drop, as the track on which the information is being recorded comes to an inner position of the magnetic disk 10 (i.e. the slower the heated region S9 moves). The downwardly oriented arrows in FIG. 13(b) indicate a variation of the peak temperatures $P_7$, $P_8$. Controlling thus the peak temperatures $P_7$, $P_8$ of the heated spots S7, S8 composing the heated region S9 allows leveling off the heating energy amount supplied to the track per unit time, irrespective of the radial position of the track on the disk.

Instead of or in addition to the foregoing control of the peak temperatures $P_7$, $P_8$, in this thermally assisted magnetic recording method, the positions $x_7$, $x_8$ corresponding to the peak temperatures of the heated spots S7, S8 may be controlled according to the moving speed of the heated region S9. In this method, provided that the disk rotation speed and the irradiation power of the laser beam L are constant irrespective of a radial position of the spot on the recording layer 12 where information is to be recorded, the heated region S9 moves slower as the track on which the information is being recorded comes to an inner position of the magnetic disk 10. Accordingly, it is preferable to control the position and the rotation angle of the diffraction grid 42 so as to increase the distance between the positions $x_7$, $x_8$ corresponding to the peak temperatures of the heated spots S7, S8, as the track on which the information is being recorded comes to an inner position of the magnetic disk 10 (i.e. the slower the heated region S9 moves). The horizontally oriented arrows in FIG. 13(b) indicate a variation of the positions $x_7$, $x_8$ corresponding to the peak temperatures. Controlling thus the positions $x_7$, $x_8$ corresponding to the peak temperatures of the heated spots S7, S8 composing the heated region S9 is advantageous in leveling off the heating energy amount supplied to the track per unit time, irrespective of the radial position of the track on the disk.

The invention claimed is:

1. A thermally assisted magnetic recording method comprising:

producing a locally heated region in a recording layer of a magnetic recording medium, the recording layer including a track; and applying a recording magnetic field to the heated region while moving the heated region, to record information;

wherein the heated region is elongated in an extending direction of the track;

wherein the elongated heated region is produced by forming a plurality of heated spots in the recording layer, the heated spots being aligned in the extending direction of the track in an overlapping manner;

wherein peak temperatures at the respective heated spots are adjusted in accordance with a moving speed of the heated region;

wherein the plurality of heated spots include a first heated spot taking a front position in the moving direction of the heated region and a second heated spot different from the first heated spot; and wherein a ratio of the peak temperature at the second heated spot to the peak temperature at the first heated spot is lower as the moving speed of the heated region becomes slower.

2. The method according to claim 1, wherein the plurality of heated spots are formed by irradiating the recording layer with a plurality of laser beams.

3. The method according to claim 1, wherein the plurality of heated spots are formed by causing a plurality of heating elements to face the recording layer.

4. A thermally assisted magnetic recording method comprising:

producing a locally heated region in a recording layer of a magnetic recording medium, the recording layer including a track; and applying a recording magnetic field to the heated region while moving the heated region, to record information;

wherein the heated region is elongated in an extending direction of the track;

wherein the elongated heated region is produced by forming a plurality of heated spots in the recording layer, the heated spots being aligned in the extending direction of the track in an overlapping manner;

wherein peak temperatures at the respective heated spots are adjusted in accordance with a moving speed of the heated region; and wherein distance of positions at which the peak temperatures of the respective heated spots are attained is adjusted in accordance with a moving speed of the heated region.

5. The method according to claim 4, wherein the distance is increased as the moving speed of the heated region becomes slower.

6. A thermally assisted magnetic recording method comprising:

producing a locally heated region in a recording layer of a magnetic recording medium, the recording layer including a track; and applying a recording magnetic field to the heated region while moving the heated region, to record information;

wherein the heated region is elongated in an extending direction of the track;

wherein the elongated heated region is produced by forming a plurality of heated spots in the recording layer, the heated spots being aligned in the extending direction of the track in an overlapping manner; and wherein distance of positions at which peak temperatures of the respective heated spots are attained is adjusted in accordance with a moving speed of the heated region.

7. The method according to claim 6, wherein the distance is increased as the moving speed of the heated region becomes slower.

* * * * *